United States Patent [19]

Koster

[11] Patent Number: 5,346,018
[45] Date of Patent: Sep. 13, 1994

[54] VEHICLE HYDRAULIC THREE-POINT HITCH AND POWER TAKE-OFF SHAFT

[76] Inventor: Rick L. Koster, 8895 N. 15 E., Idaho Falls, Id. 83401

[21] Appl. No.: 966,515

[22] Filed: Oct. 26, 1992

[51] Int. Cl.⁵ .............................................. A01B 33/08
[52] U.S. Cl. ...................................... 172/47; 180/53.1; 37/231; 37/235; 172/75; 172/125; 172/272; 172/439
[58] Field of Search ................... 172/47, 75, 103, 125, 172/272, 273, 439, 443, 453; 37/231, 235, 234, 236, 241, 244, 257; 180/53.1, 53.3; 474/136, 133, 101

[56] References Cited

U.S. PATENT DOCUMENTS

| | | | |
|---|---|---|---|
| 1,787,514 | 1/1931 | Dean et al. | 474/133 |
| 2,144,311 | 1/1939 | Klauer | 37/231 |
| 2,581,535 | 1/1952 | Jackson | 180/53.1 |
| 3,118,315 | 1/1964 | Loosli | 474/136 |
| 3,450,220 | 6/1969 | Frandsen et al. | 180/53.1 |
| 4,176,727 | 12/1979 | Perin | 172/272 |
| 4,244,122 | 1/1981 | Hitrick . | |
| 4,258,765 | 3/1981 | Suomi | 180/53.1 |
| 4,315,534 | 2/1982 | Blackstone | 180/53.3 |
| 4,317,500 | 3/1982 | Bening | 180/53.1 |
| 4,391,052 | 7/1983 | Guy, Jr. | 37/236 |
| 4,554,751 | 11/1985 | Nicolosi et al. | 37/234 |
| 4,805,927 | 2/1989 | Stephenson et al. | 180/53.1 |
| 4,807,375 | 2/1989 | Iraci | 37/236 |
| 4,825,970 | 5/1989 | McVicar et al. | 180/53.7 |
| 4,979,092 | 12/1990 | Bergene et al. | 172/3 |
| 5,040,615 | 8/1991 | Fletcher | 172/47 |
| 5,072,633 | 12/1991 | Smith | 474/136 |
| 5,169,367 | 12/1992 | Narkum et al. | 474/101 |

FOREIGN PATENT DOCUMENTS 317746  5/1989  European Pat. Off. .............. 172/47

Primary Examiner—Randolph A. Reese
Assistant Examiner—Spencer Warnick
Attorney, Agent, or Firm—Hopkins, Roden, Crockett, Hansen & Hoopes

[57] ABSTRACT

An inventive three-point hitch assembly that attaches to the front end of a truck or pickup and supports at three points a plurality of implements or tools. It has a belt-driven power take-off for rotary tools that is controlled by an electric clutch and driven by a pulley attached below the truck engine pulley. A hydraulic lift cylinder raises and lowers the hitch and implement or tool, which by the hitch parallelogram form maintains the implements in a vertical orientation. The lift cylinder hydraulic pressure is supplied by connections to the truck power steering system via electrically controlled solenoid valves.

1 Claim, 9 Drawing Sheets

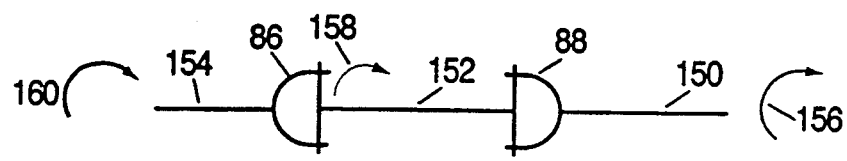
FIGURE 6
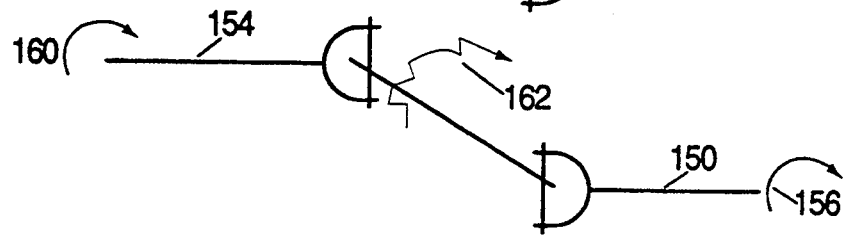
FIGURE 7
FIGURE 8

VEHICLE HYDRAULIC THREE-POINT HITCH AND POWER TAKE-OFF SHAFT

FIELD OF THE INVENTION

This invention relates to a removable, three-point hitch assembly that attaches to the front end of a truck or pickup and has a power take-off (PTO) for rotary-driven tools that can be attached to the hitch assembly. The power take-off is belt driven by the truck engine through a clutch. The hitch also has a hydraulic lift that raises the hitch and maintains the tool or implement in a vertical orientation. Hydraulic lift power is taken from the vehicle power steering system.

BACKGROUND OF THE INVENTION

U.S. Pat. No. 4,825,970 (referred to herein as '970) issued to McVicar et al. on May 2, 1989, discloses a power take-off for a road vehicle. A significant disadvantage in the '970 patent is the inability to raise and lower the snowblower or adjust its elevation since it is fixed by insertion of bars into square tubes. Belt adjustment or removal on this is somewhat difficult and it is not clear how the belt adjustment works.

A second invention, U.S. Pat. No. 4,244,122, issued to Hitrick on Jan. 13, 1981, discloses a modified power unit for a snow plow attachment to a vehicle having an improved power piston to raise and lower the plow blade. Hydraulic power is obtained from an extra separately mounted, electric motor driven, gear-type oil pump.

The present invention overcomes the above shortcomings as described below:

a parallelogram, pivoting hitch frame is disclosed that can be easily raised and lowered using a hydraulic by-pass line from the power steering of a truck or pickup and maintains any tool or implement in a vertical orientation whether the implement is in a raised or lowered position or any continuum between the raised and lowered positions;

the hitch is easily attached at only four points to the truck frame and two points to the bumper;

the single-point attachment of the clutch/PTO drive assembly to the engine is easily adjustable for belt tension and the driven-hitch pulley remains at a fixed distance in spite of engine motion;

the pivoting power take-off clutch is attached to the hitch and not the engine or vehicle frame;

the power take-off spline is coupled to a double universal-joint drive shaft so that the output end rotates at a constant angular velocity; and the power take-off has a common universal tractor-type male spline used throughout the implement product lines.

SUMMARY OF THE INVENTION

An inventive three-point hitch assembly is disclosed that attaches to the front end of a truck or pickup and supports at three points a plurality of implements or tools. It has a belt-driven power take-off for rotary tools that is controlled by an electric clutch and driven by a pulley attached below the truck engine pulley. A hydraulic lift cylinder raises and lowers the hitch and implement or tool, which by the hitch parallelogram form maintains the implement in a vertical orientation. The lift cylinder hydraulic pressure is supplied by connection to the truck power steering system via electrically controlled solenoid valves.

Briefly stated, the invention generally consists of a three-point hitch assembly for attachment of an implement to a vehicle comprising:

a frame bracket to attach to the vehicle frame;

a pair of pivot arms pivotally attached to the frame bracket;

hydraulic lift means mounted on the frame bracket for raising and lowering the pivot arms;

a belt-driven power take-off mounted on the frame bracket connecting to a vehicle engine pulley through an electric clutch;

electrical control means to control the hydraulic lift means and electric clutch; and wherein the implement is maintained in a vertical orientation in a raised and lowered position and in a continuum between the raised and lowered positions.

Other objects, advantages, and capabilities of the present invention will become more apparent as the description proceeds.

BRIEF DESCRIPTION OF THE DRAWINGS

FIGS. 6, 7, and 8 are schematic mechanical representations of universal joints and drive shafts;

DETAILED DESCRIPTION OF THE INVENTION

Figure 1:
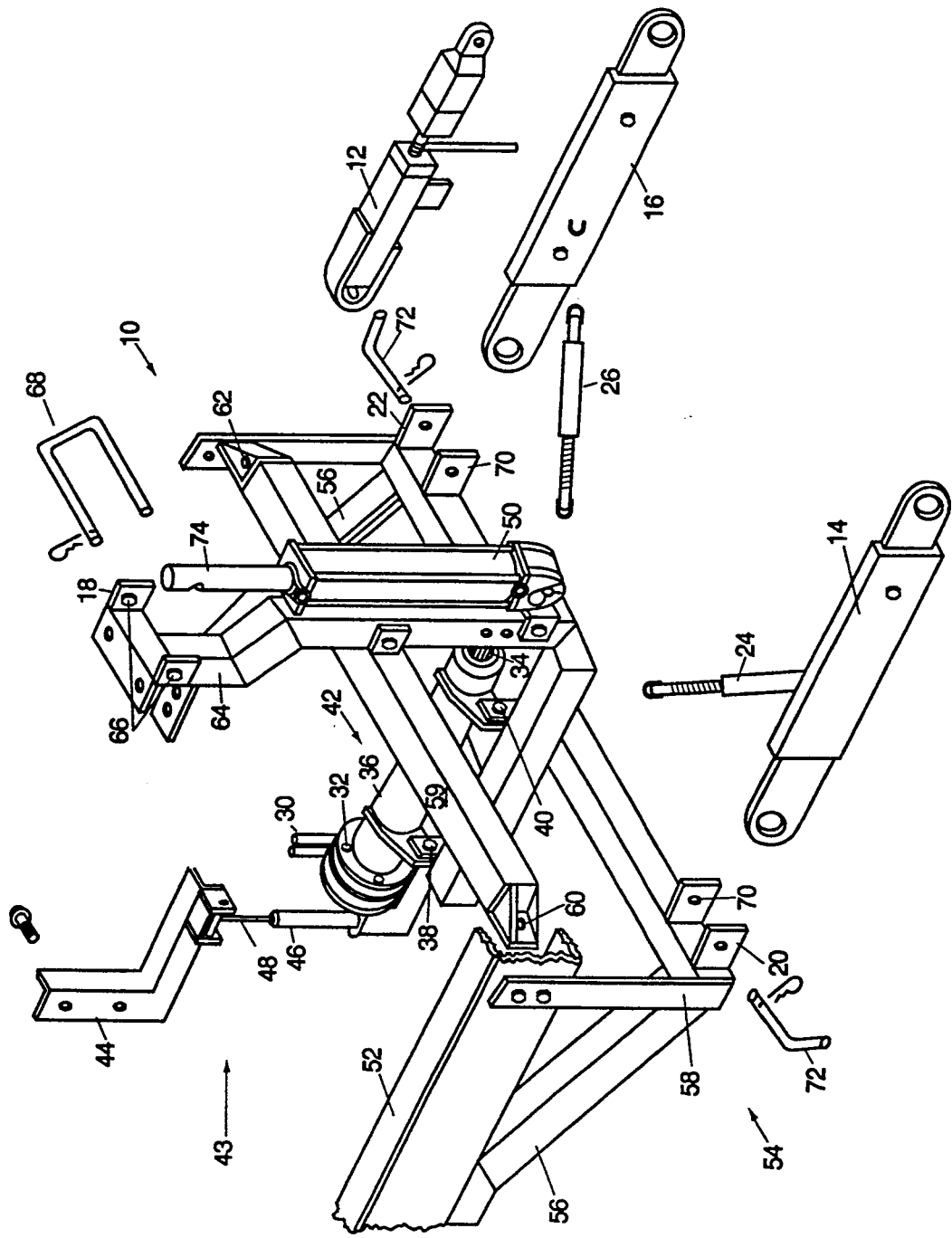
FIG. 1 is an exploded front perspective view of the hitch assembly of the present invention.

Referring to FIG. 1, a bolt-on, three-point hitch-type assembly 10 is made in various configurations to fit various years, makes, models, and engine sizes of domestic two- or four-wheel drive pickups and trucks. The hitch 10 allows the hook-up, support for transporting, hydraulic raising, hydraulic lowering, and power take-off (driving) of numerous attachments (implements), similar to the way implements are attached and driven on tractors. The hitch assembly 10 consists of three pivoting arms: one upper pivot arm 12 and two lower pivot arms 14 and 16; all three of which accept the attachment of various desired implements. These arms and their corresponding pivot points 18, 20, and 22 are arranged as such that as the implement is raised or lowered the implement remains parallel with the ground or road. This is necessary on universal-jointed power-driven attachments to prevent a variating velocity of the rotating components within the attached implement. A pair of adjustable turn-buckles 24 and 26 are attached to each of the lower arms 14 and 16; the other ends being attached to a solid mount installed rigidly to the hitch assembly lower cross arm 28. These turn-buckles 24 and 26 allow adjustment and control of the side-to-side swaying movement of the attached implement. This swaying movement is desirable to allow the attached implement to float over uneven ground contour. The powering (driving) of the attachment is accomplished via a belt-drive system 30 from the front of the vehicle's engine's crankshaft to a 12-volt magnetic clutch 32, mounted to the end of a jackshaft 34. This jackshaft power take-off (PTO) is bearing-mounted inside a machined power take-off tube 36 which is mounted to the hitch via two pivot points 38 and 40, allowing the entire PTO/clutch assembly 42 to pivot separately from the hitch assembly. A belt adjusting and tension maintaining means 43 consists of: an engine bracket 44 bolted to the vehicle engine, an arm 46 attached to the PTO/clutch assembly tube 36, and an adjustable and pivoting threaded shaft 48 mounted between this bracket 44 and arm 46, which allows belt-tension adjustment and also maintains constant belt tension while the vehicle engine remains free to move, or "torque" within its rubber motor mounts. The hydraulic lift cylinder 50 for the three-point hitch is powered by the vehicle's power-steering pump via a 12-volt solenoid-activated valve system. The hydraulic lift cylinder 50 is connected to an oil pump, steering cylinder, and oil cooler by high-pressure hoses as will be described later.

The three-point hitch is attached to the truck frame 52 by frame bracket 54. This frame bracket 54 will vary with the type of vehicle but generally consists of diagonal brackets 56 and vertical brackets 58 which bolt to the truck frame 52. An upper cross-arm 59 bolts to the truck front bumper in two places at 60 and 62 and supports upright bracket 64 and clevis 66. The pivot point 18 supports the upper pivot arm 12 when connected by clevis U-pin 68. In a similar manner lower pivot arms are held in the pair of clevises 70 by pins 72. Removal of the arms 12, 14, and 16 is easily accomplished, when not in use, by removal of the pins 68 and 72. U-pin 68 also is designed to hold hydraulic cylinder in a stowed vertical position by inserting U-pin 68 into piston rod aperture 74 and the clevis 66.

Figure 2:
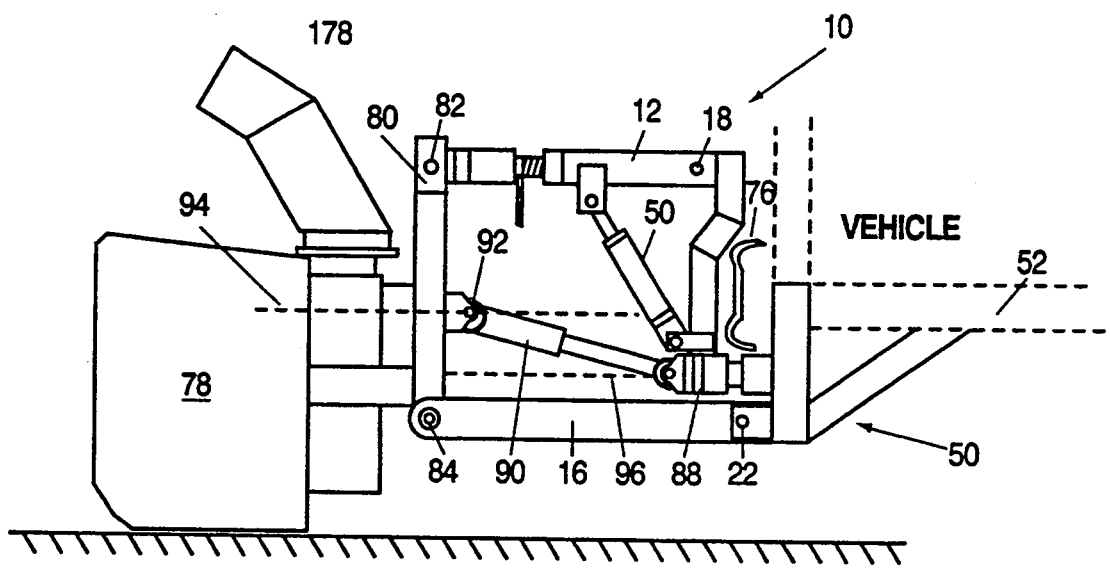
FIG. 2 is a side elevation of the hitch assembly with an attached snowblower in a lowered position.
Figure 3:
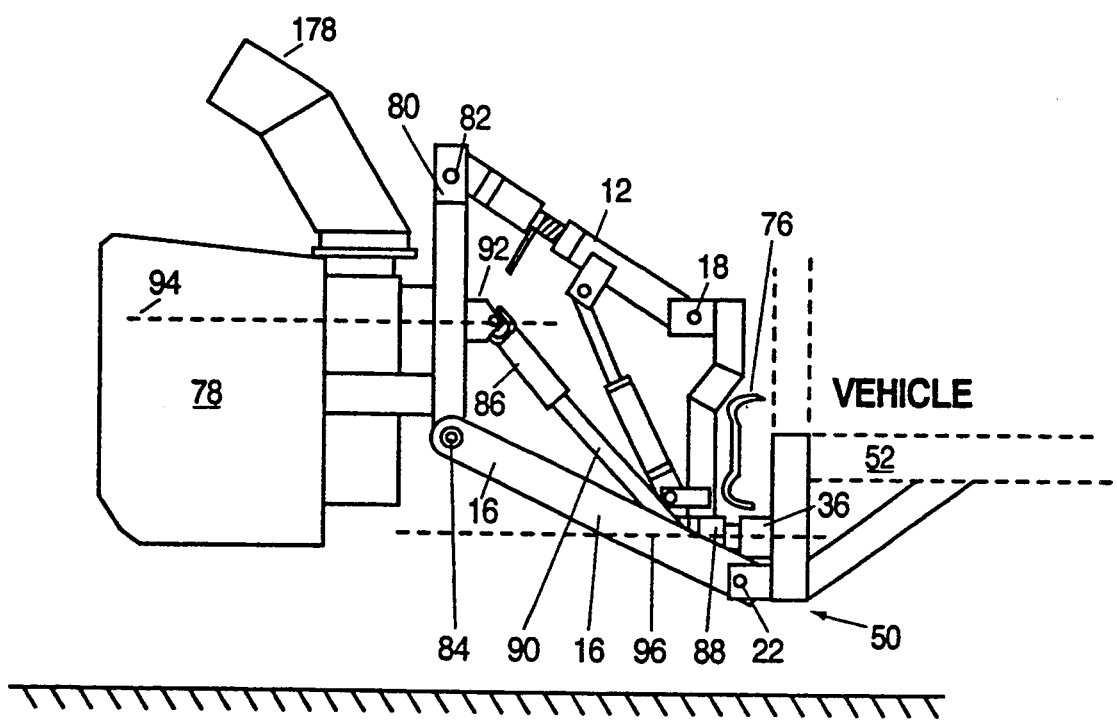
FIG. 3 is a side elevation of the hitch in a raised position.

Operation of the three-point hitch will be described by referring to FIGS. 2 and 3, showing hitch 10 attached at the vehicle frame 52 and at bumper 76 (both shown in phantom). The implement 178, in this case a snowblower, has a vertical bracket 80 that connects pivotally to the upper pivot arm 12 and the lower pivot arms 14 and 16 at 82 and 84. In the figures, it can be seen that the upper and lower pivot arms 12 and 16 are parallel and the pivot points 82 and 84 are reasonably parallel to pivot points 18 and 22. These configurations form a rough parallelogram, which, for vertical motions of about one foot, maintain the vertical bracket 80 of the snowblower in a vertical orientation.

The parallelogram configuration of FIGS. 2 and 3 also demonstrates an advantage of this hitch which has a pair of upper and lower universal joints 86 and 88 connecting jackshaft 34 to intermediate shaft 90 and output yoke 92 of the implement 178. It can be seen that in either lowered implement position (FIG. 2) or raised position (FIG. 3), the centerlines 94 and 96 remain horizontal and parallel. This parallelism gives a constant rotational velocity to the output yoke 92 as will be described later.

Figure 4A:
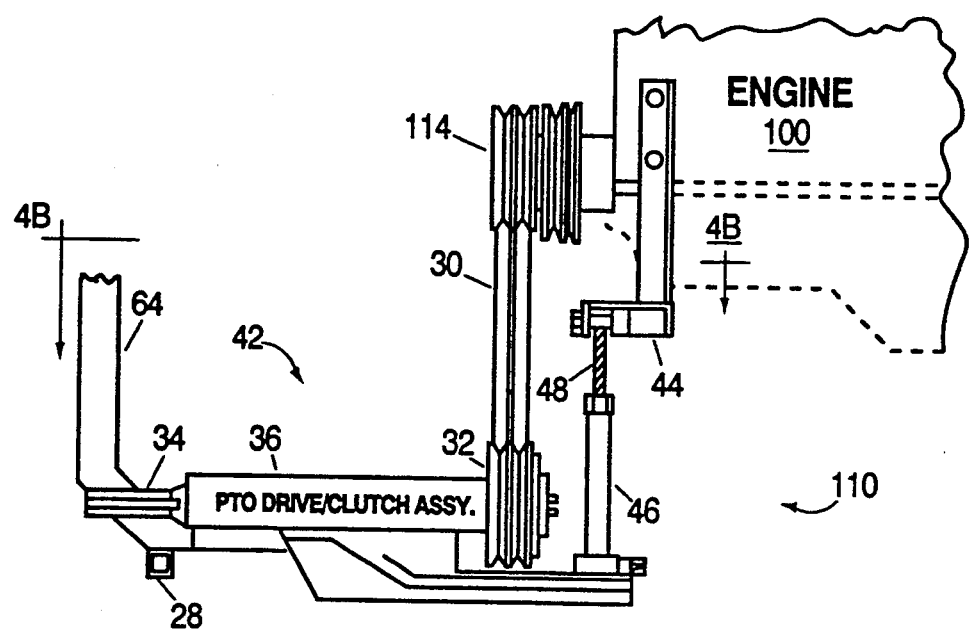
FIG. 4A is a partial side elevation of a power take-off and clutch assembly.
Figure 4B:
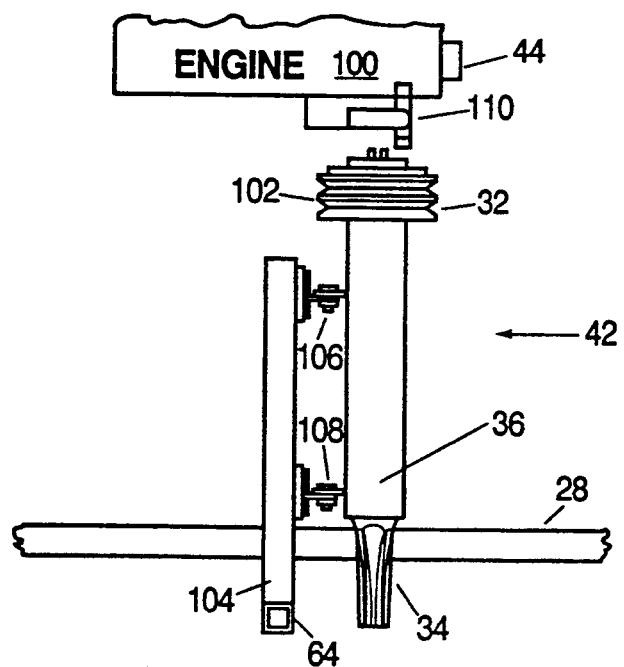
FIG. 4B is a plan view of the power take-off and clutch assembly.
Figure 4C:
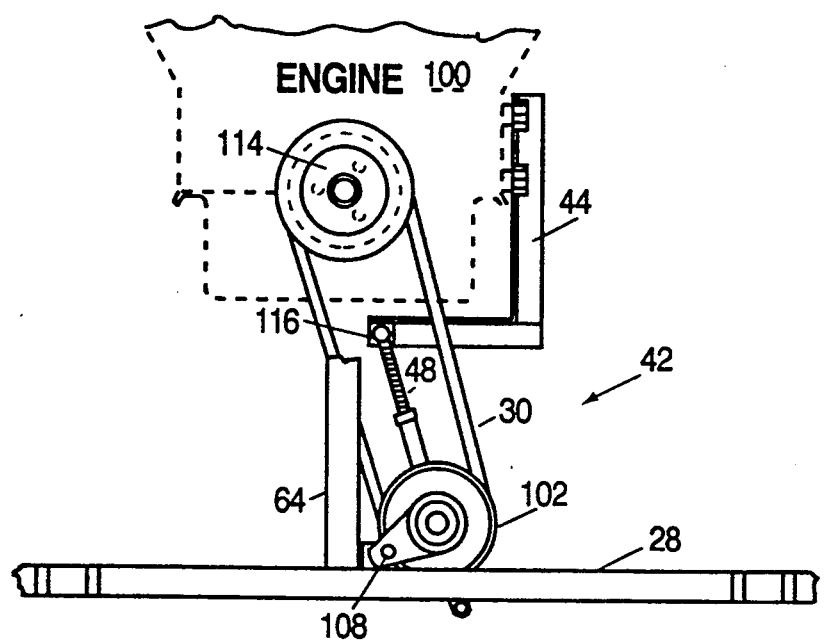
FIG. 4C is a front elevation of the power take-off and clutch assembly.

The drive for the jackshaft 34 and lower universal joint 88 is through the clutch 32 and power take-off assembly 42 and is shown in more detail in FIGS. 4A, 4B, and 4C. Engine 100 connects to the pulleys 102 via belts 30. This assembly 42 is pivotally attached to the mounting tube 104 at pivot points 106 and 108. This pivotal mounting provides a belt adjusting and maintaining means 110 that, after adjustment, of the adjusting nut 112 on the pivotal threaded shaft 48, maintains a constant belt 30 tension regardless of engine motion, i.e., up, down, or rotation on its motor mounts. In a preferred arrangement, engine pulley 114, pivot point 116, and clutch pulley 102 are in a straight line as shown in FIG. 4C.

Figure 5:
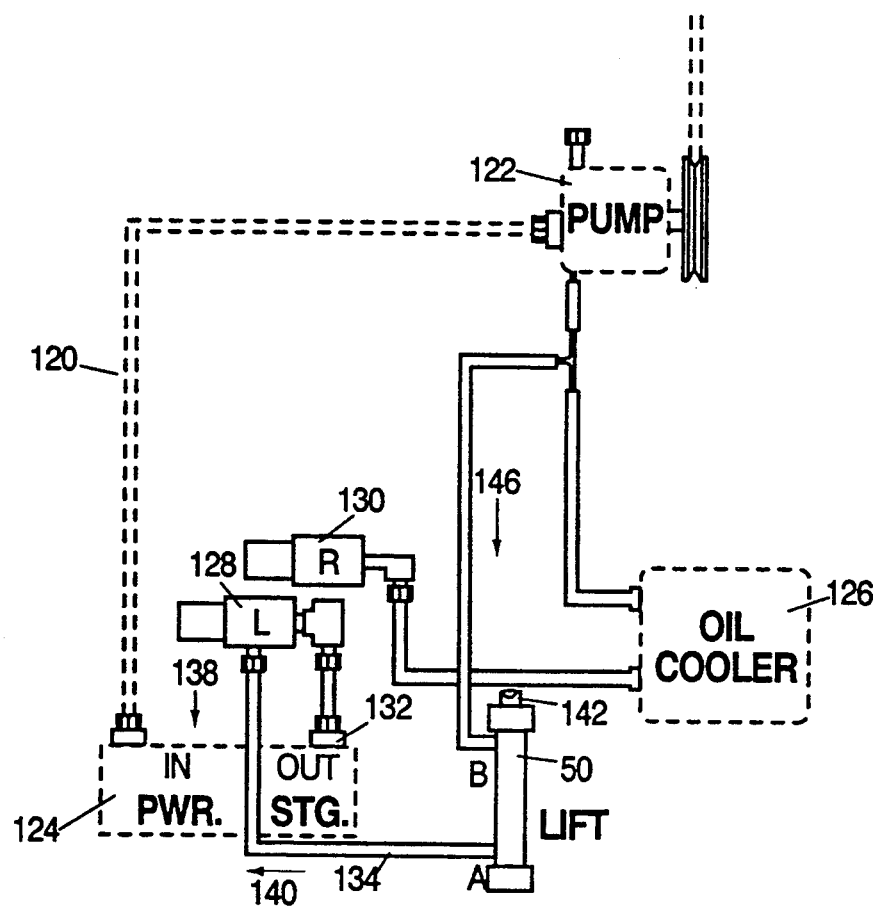
FIG. 5 is a schematic diagram of the hydraulic system.

Referring now to FIG. 5, the hydraulic power means is illustrated at 120. The vehicle's components shown are hydraulic steering pump 122 which pumps oil to the power steering gearbox 124 which normally would exhaust to the oil cooler 126 and then return to the pump 122. The system is modified by adding a lower solenoid valve 128 and a raise solenoid valve 130 at the outlet piping connection 132 of the steering gearbox. The outlet from the lower solenoid valve connects at 134 to the bottom port A of hydraulic lift cylinder 50. The outlet from raise solenoid valve 130, which is a normally open valve, returns the oil to the cooler 126. To raise the lift, raise solenoid valve 130 is energized closing the valve. The oil is, therefore, diverted through lower solenoid valve 128 to the raise port A of the lift cylinder 50. Lower solenoid valve 128 has an internal check valve that allows flow only in direction at arrow 138 until it is energized.

After raising the lift, raise solenoid 130 is de-energized and the oil in cylinder 50 is trapped below the cylinder piston and in piping 134 because of the check valve feature within lower solenoid valve 128. To lower the lift cylinder 50, lower solenoid valve 128 is now energized, opening the valve and allowing the oil in cylinder 50 to flow as at arrow 140 back through lower solenoid valve 128, through the raise solenoid valve 130, and through the cooler 126. The lower operation relies on the weight of the implement that forces the piston and piston rod 142 downward. At this time, oil is returned to lower port B of the cylinder 50 by flow through return pipe 144 as at arrow 146.

A description of the universal joint operation and its effect on shaft rotation will be presented by referring to FIGS. 6-8. FIG. 6 schematically illustrates three in line shafts, drive or jackshaft 150, intermediate shaft 152, and output shaft 154, separated by upper and lower universals 86 and 88. Since the three shafts are in line, a constant rotational velocity at drive shaft 150 as at arrow 156 will produce a constant rotational velocity at both intermediate shaft 152 and output shaft 154 as at arrows 158 and 160. In contrast, when an intermediate shaft 152 is angled relative to drive shaft 150 (FIG. 7), a constant rotation at drive shaft 150 produces a variating intermediate shaft rotation as indicated at 162. The variating shaft 152, if it were connected to a rotating tool, would have excessive undesirable vibration in the tool. To avoid this problem, the output shaft 154 (FIG. 8) is maintained parallel to drive shaft 150 so that both shafts are at constant velocity, even though angled intermediate shaft 152 is variating in rotation as at 162. The output shaft or yoke 92 (FIG. 3) is maintained parallel to the drive shaft by the parallelogram configuration of the pivot arms 12 and 16, the snowblower bracket 80, and the pivot points 18 and 22, as previously described.

Figure 9:
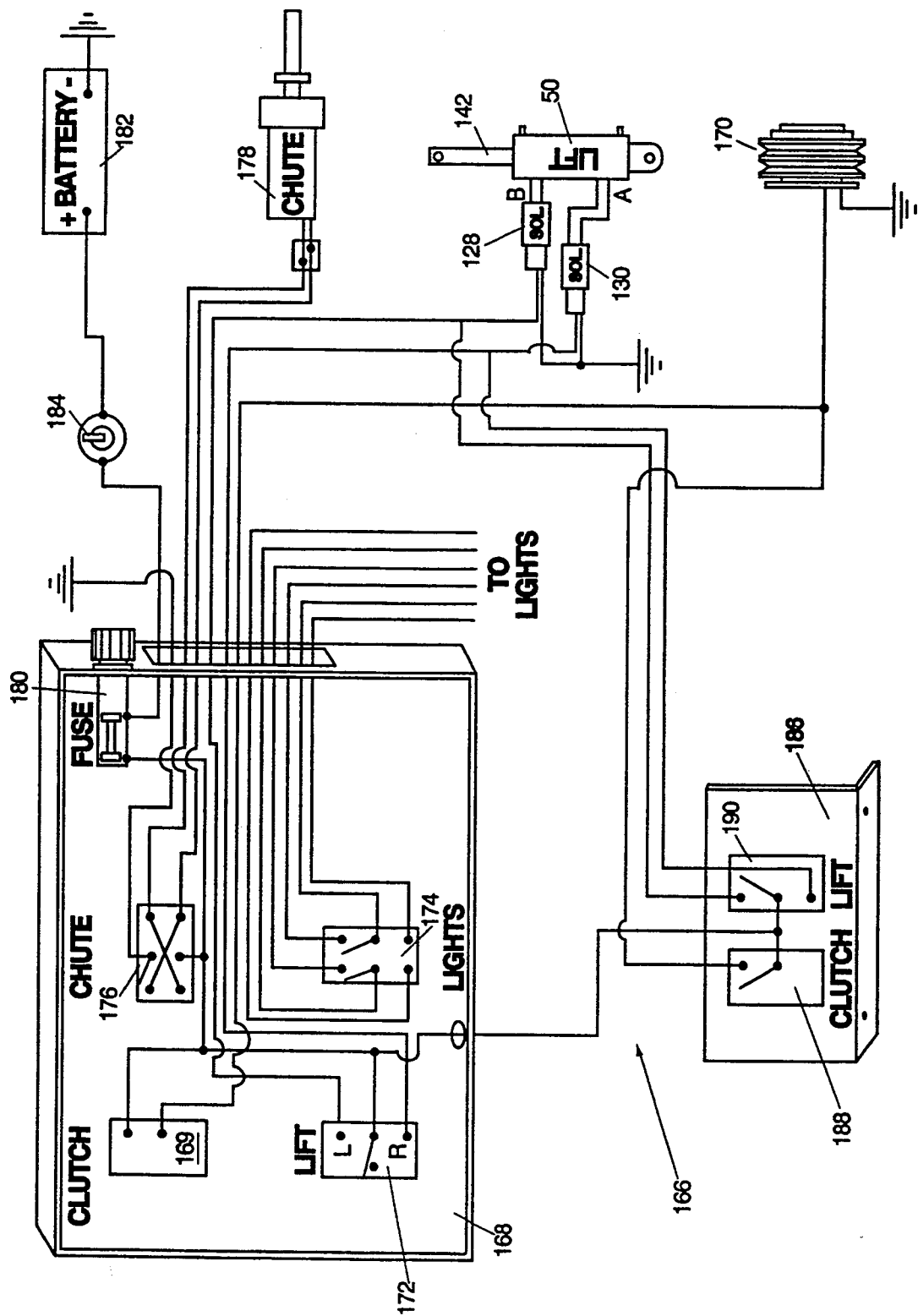
FIG. 9 is an electrical schematic of the hydraulic cylinder control system, clutch, and other electrical auxiliary attachments.

The electrical solenoid control means 166 can be seen at FIG. 9. A cab control box 168 within the driver's reach contains all the system controls and lights for the hitch control. A single-pole single throw switch 169 controls the electric clutch 170. Hydraulic lift 50 is raised or lowered by switch 172 which activates the raise solenoid valve 130 and lower solenoid valve 128.

Optional lights for night work (not shown) can be controlled by switch 174. Chute control switch 176 controls rotation of snowblower chute 178 (FIGS. 2 and 3) to direct the blown snow left or right. In-line fuse 180 provides circuit overload protection. The system is powered by the vehicle 12-volt battery 182 through ignition switch 184. A separate out-front control panel 186 contains a second clutch switch 188 and a second lift switch 190 for local control during maintenance, implement hookup operations at the hitch, or when controlling a local tool, i.e., the posthole digger. A preferred location for the out-front control panel 186 would be under the hood, near the front of the vehicle.

The implements that can attach to this three-point hitch in addition to the snowblower shown in FIGS. 2 and 3 include the following:
- a rotary broom;
- a weed sprayer pump system;
- a posthole digger;
- a rototiller;
- a winch;
- an air compressor;
- an electric generator;
- a log splitter;
- a welding generator;
- a cement mixer;
- an airless paint sprayer;
- a high-pressure washer; and
- a pivoting crane arm for use with the winch.

The specifications for the three-point hitch, power take-off, and hydraulic lift are listed below:

The maximum lifting capacity is 600 lbs. or the maximum rating of the front suspension and tires, whichever is less. The three-point hitch used Category 1 (pivot point bushing size at 82 and 84 of FIGS. 2 and 3) or Category 0, optionally. The hydraulic lift cylinder 50 (FIG. 1) is a $2\frac{1}{2}''$ bore by $8''$ stroke, single acting (gravity return) cylinder. The PTO drive shaft system is powered by double U-belts through a 12-volt clutch 32 (FIG. 4) and has a 20 horsepower @ 120 foot-pound rating. The output shaft is a standard $1\frac{3}{8}''$ male, 6-spline shaft that fits most tractor implements.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A three-point hitch assembly for attachment of an implement to a vehicle comprising:
   a. a frame bracket to attach to the vehicle frame;
   b. a pair of lower pivot arms pivotally attached to the frame bracket;
   c. hydraulic lift means mounted on the frame bracket for raising and lowering the pivot arms;
   d. an upper pivot arm connecting to the hydraulic lift means;
   e. a belt-driven power take-off assembly and electric clutch mounted on the frame bracket connected below a vehicle engine pulley, the power take-off assembly and electric clutch further comprising:
      1) an engine bracket attached to the engine;
      2) a pivotal threaded shaft attached to the engine bracket;
      3) an adjusting nut on the threaded shaft;
      4) an arm engaging the pivotal threaded shaft and adjusting nut;
      5) a power take-off tube pivotally attached to the frame bracket; and
      6) a jackshaft within the power take-off tube, wherein belt tension is set by the adjusting nut and constant tension is maintained on the belt regardless of engine motion;
   f. electrical control means to control the hydraulic lift means and electric clutch; and wherein the upper and lower pivot arms are maintained in a parallel configuration in a raised and lowered position thereby maintaining the implement in a vertical orientation in a raised and lowered position and in a continuum between the raised and lowered position.

* * * * *